Nov. 28, 1939. A. HORLEBECK ET AL 2,181,130
STEAM OVEN FOR BAKING
Filed Nov. 23, 1937
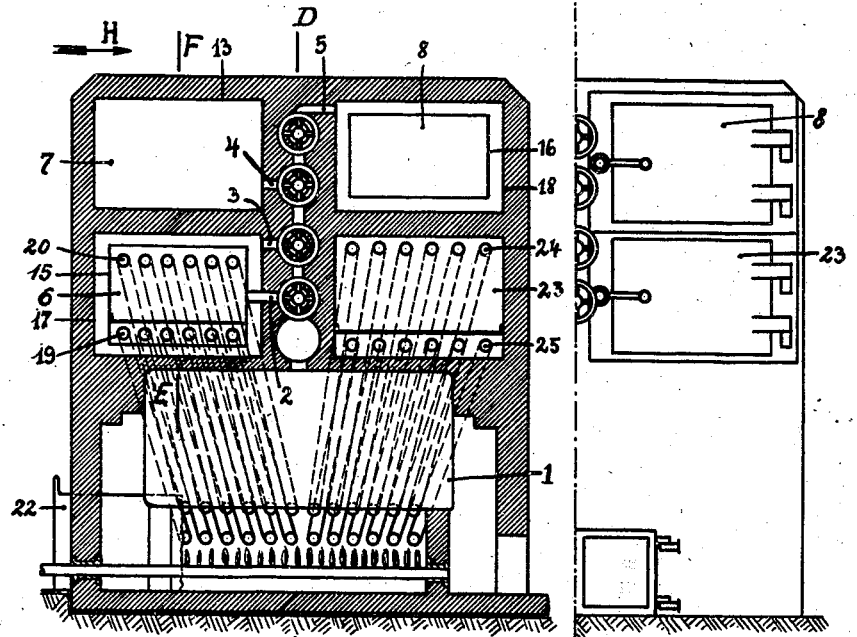
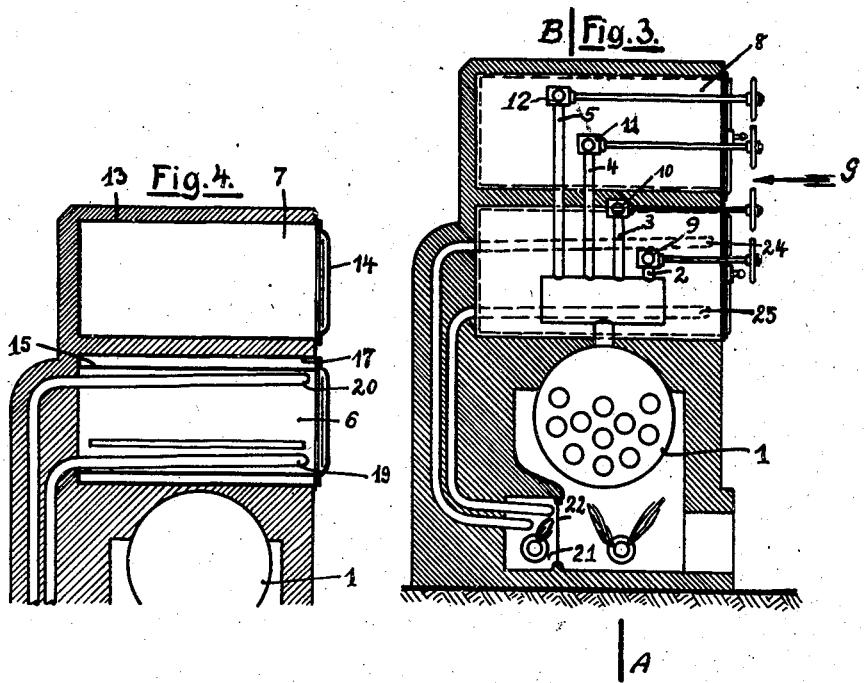

Patented Nov. 28, 1939

2,181,130

UNITED STATES PATENT OFFICE 2,181,130

STEAM OVEN FOR BAKING

Albert Horlebeck and Clemens Wiesmann, Wuppertal-Barmen, Germany

Application November 23, 1937, Serial No. 176,040
In Germany March 27, 1937

5 Claims. (Cl. 107—63)

Steam ovens for baking, in which the baking heat is produced by heater tubes or superheater tubes are known. In these ovens heating tubes closed at both ends are laid in the baking chamber of the oven and cover most the bottom of the baking chamber and are closed at both ends. These are seamless tubes with ends closed by welding, partly filled with water, one end of each tube projecting into the furnace. By the heat, produced in the furnace by coal, gas or electric current, the water in the tubes is brought to the boil so that steam is generated which, with increasing pressure, radiates heat up to approximately 250° C. through the tubes into the baking chamber. In such ovens the oven-walls and roof are made of material having bad heat conducting properties such as fire bricks which serve as heat accumulators. The heat radiated by the heating tubes into the baking chamber is accumulated in the walls of this chamber and the baking can begin only when the oven arch has been completely heated through. Up to the complete heating through of the oven arch, especially up to the formation of top heat, a longer heating time is necessary. In baking, it is customary in the trade to first heat the oven to a high temperature, whereupon the fire is allowed to burn down so that the baking process can begin with the heat accumulated in the walls. At this high temperature baking goods are baked open, that is without baking tins or in baking tins open at one side. As the oven cools down, it will be possible to bake fine baker's and confectioner's goods. The sequence of the baking of the different kinds of goods is therefore strictly dependent upon the decreasing heat radiation of the oven. Considerable inconveniences result herefrom, as it is not possible to reheat to high temperatures rapidly and in a short time, the oven which has once cooled. The baker is therefore compelled to arrange his work to a considerable extent according to the oven and cannot regulate the oven to meet his requirements.

On the other hand, baking- or cooking-ovens are known, in which the baking chamber has hollow spaces at one or three sides into which steam can flow from a steam producer arranged directly under the baking-chamber or at the side of the same. In ovens of this type a uniform bottom heat can be obtained with uniform steam pressure, if the bottom of the baking chamber or with the bottom and the two side walls are heated. While renouncing heat accumulation in the arch, sufficient top heat is obtained by discharging the heating gases of the furnace through a smoke tube or through a smoke chamber of iron arranged under the roof of the baking chamber and possessing good heat-permeability. If in these ovens the side walls are not heated by steam, flues for the waste gases from the furnace are also provided on the side walls. With these baker's ovens on the one hand a good utilisation of heat and on the other hand a uniform heat which can always be estimated has to be produced. In comparison with bottom or side heat produced from steam a too intensive top heat is, however, produced so that the baking goods become too brown on the top, whereas on the lower side they do not become brown enough. The heat in the flues decreases too rapidly when the fire is dying down, as heat accumulation is not possible in the walls of the smoke chamber which are mostly made of sheet metal and rather thin in consideration of good heat permeability. The advantages of these ovens are consequently neutralized by the inconveniences.

It is also known, to admit steam into the baking chamber itself, not for the production of baking heat, but for the formation of vapours in order to favour the crust formation during the baking.

The invention relates to a steam baking oven without the inconveniences of the baking ovens of known type, adapted to be used in various manners and to be adjusted at any time for the rapid development of any desired temperature, this being especially desirable in small bakeries. The oven consists in known manner of several heat accumulating sheet metal boxes separated the one from the other and serving as baking chambers, the manner of heating being different for each of these boxes. One type of baking chambers is heated by heating tubes of known type closed at both ends and laid on the bottom and under the roof, whereas the second type of baking chambers is surrounded on all sides by a hollow space owing to double walls, said hollow space adapted to be filled with vapour supplied by a steam generator. Another baking chamber is also heated by steam, the steam being, however, not conducted into a hollow space surrounding the baking chamber but directly into the baking chamber itself. This latter manner of heating is employed especially, if the goods have to be baked in moulds closed on all sides. The heat radiated from low pressure steam is sufficient herefor. Finally, all three kinds of heating are provided in one and the same baking chamber, so that heat produced in three different ways is available for baking, firstly by the heating tubes, secondly by the steam jacket enclosing the baking chamber and thirdly by steam conducted directly into the baking chamber. The steam generator in the form of a small-size steam boiler or the like is arranged either under the baking chambers or at a distance from the same, so that the steam can be fed into the chambers by short steam conduits. The heating gases are merely used for the steam generation, as the flues do not communicate with the baking chambers. From one source of heat different baking temperatures can therefore be produced at the same time in the several baking chambers. The baking heat is not dependent of the cooling of the heat accumulator enclosing the baking chamber, as this accumulator merely acts as isolation. By the various kinds of heat supply into the individual baking chambers a complete control of the oven is possible. On the one hand, low temperatures can be produced with low pressure steam in the steam jacket and in the baking chamber itself. For higher temperatures the heating tube system is additionally used. If all kinds of heating are united in one baking chamber special advantages result, which ensure to the user of the oven all possibilities of the heat generation as desired. One or several baking chambers are preferably built up directly over the steam generator, the latter being heated by coal, gas or electricity, and the heating tubes projecting into the heating chamber are heated at the same time or separately. The heat can be shut off from the heating tubes or from the steam generator by means of slides or dampers. In this manner low temperature can be produced by steam in such baking chambers which have merely a steam jacket or into which the steam is conducted directly. By the heating tube system of known type the baking temperature can be increased as desired up to the maximum limit required in practice in the same baking chamber or in baking chambers arranged separate from the same. The new baking oven is therefore a combination of technical features some of which are already known, so that heat can be supplied to the baking chambers in three manners. The advantages of the invention are increased in that several baking chambers are arranged the one at the side of the other or the one above the other, said baking chambers comprising preferably only one, two or three possibilities of admission so that the baking temperatures, differing according to the kind of admission, can be produced simultaneously in the individual chambers, and the baker is in position to bake at the same time goods of very different kinds.

An embodiment of the invention is illustrated, by way of example, in the accompanying drawing which shows a baking oven with four baking chambers.

Fig. 1 shows the baking oven and the baking chambers in section on line A/B of Fig. 3 viewed in the direction of the arrow G.

Fig. 2 shows in front elevation the right hand half of the oven.

Fig. 3 is a cross-section through the masonry and the steam generator with the two right hand side baking chambers in side elevation, the section being taken along line C/D of the Fig. 1 and viewed in the direction of the arrow H.

Fig. 4 shows a section through the two left hand side baking chambers along line E/F of Fig. 1 viewed in the direction of the arrow H.

In the small-size boiler 1, for which any other suitable steam generator may be substituted, steam is produced by heating with coal, gas or electricity. The steam is conveyed through conduits 2, 3, 4, 5 to the baking chambers 6, 7, 8, 23 preferably arranged directly above the steam generator the one at the side of the other or the one above the other, the steam supply being adaptable to the heat consumption by shutting-off valves 9, 10, 11, 12. The upper left hand baking chamber 7 consists of a single baking box 13 (Fig. 4) insulated on the outer side. The steam is supplied for instance at low pressure directly into the baking chamber 7 formed by the sheet metal box 13. This baking chamber can be tightly closed by a door 14. This baking chamber 7 serves for baking dough in moulds closed on all sides. The baking chambers 6, 8 consist also of sheet metal boxes 15, 16 which are, however, each enclosed in a second sheet metal box 17, 18 respectively, a jacket being formed between these two boxes, into which the steam can flow from the steam generator 1 through pipe conduits 3, 5. Another steam supply 2 is, however, provided for the baking chamber 6 so that this chamber can be heated as desired, either by direct steam admission into the chamber or from the steam jacket. In order, however, to attain in this baking chamber 6, not only the temperatures with low steam pressure, but also higher temperatures, another heating tube system of known type is provided. The heating tubes 19, 20 closed at both ends and partly filled with water, project with one end into the baking chamber, whereas the other shorter end projects into the furnace 21. Steam of high pressure is generated in these tubes and radiates high temperatures into the baking chamber. By slides 22 or dampers the heat supply to the heating tubes or to the steam generator can be adjusted as desired, either so that steam is produced in the boiler and directly conducted into the baking chamber or into the jacket of the same, the heating tubes then not radiating any heat so that a low baking temperature is produced, or so that heating tubes alone heat baking chamber or better still in combination with the steam generated in the boiler, in order that high baking temperatures are attainable. The fourth baking chamber 23 consists only of a sheet metal box which is adapted to be heated alone by the heating tubes 24, 25. All baking chambers can be tightly closed by doors in the usual manner. The various possibilities of utilizing one source of heat for heating one or in several separate baking chambers enables the oven to be used with advantage, as it possesses all desirable properties.

We claim:

1. A steam baking oven, comprising in combination a furnace, a steam boiler heated by said furnace, a plurality of baking chambers arranged above said furnace, a low pressure steam conduit extending from said boiler directly into at least one of said chambers, a branch from said chamber leading to the outer side of at least another of said chambers, means for shutting off said branches, and superheater tubes extending from said furnace into at least yet another of said chambers.

2. A steam baking oven as specified in claim 1, in which the branch leading to the first chamber discharges steam directly into the chamber, the second chamber consists of a sheet metal box and a jacket surrounding said box, and the branch leading to this chamber discharges into said jacket, and the superheater tubes extend along the top and bottom of their chamber.

3. In a steam baking oven as specified in claim 1, at least one baking chamber comprising a metal box, a jacket surrounding said box, a branch leading from the low pressure conduit into said box, a second branch leading from said conduit to said jacket, and superheater tubes in said box extending along the top and bottom thereof.

4. A steam baking oven as specified in claim 1, in which the superheater tubes are closed at both ends and partly filled with water and each comprises a U-shaped tube having a short lower portion extending into the furnace and a long portion extending substantially parallel to the side walls of the chamber.

5. A steam baking oven as specified in claim 1, in which the means for shutting off the branches are operable from the front of the oven.

ALBERT HORLEBECK.
CLEMENS WIESMANN.